Patented Feb. 11, 1930

1,746,783

UNITED STATES PATENT OFFICE

WILBUR A. LAZIER, OF ELMHURST, DELAWARE, ASSIGNOR TO E. I. DU PONT DE NEMOURS & COMPANY, OF WILMINGTON, DELAWARE, A CORPORATION OF DELAWARE

CATALYTIC PROCESS

No Drawing.   Application filed November 3, 1928.  Serial No. 317,119.

This invention relates to catalytic processes and it comprises, more particularly, the process of carrying out catalytic reactions by passing reactive gas mixtures at suitable temperatures and pressures over highly efficient chromite catalysts, such catalysts having been prepared by heating multiple chromates of metals and nitrogen bases to convert hexavalent chromium into trivalent chromium, thus forming chromites.

This application is a continuation in part of my co-pending application Serial No. 115,692, filed June 12, 1926.

Numerous mixtures and combinations containing oxides of chromium and other metals have been made and used as catalysts in various processes. Such mixtures have been prepared in many different ways, but those prepared by heating have generally been reduced with hydrogen since it has been found, in the past, that heating the usual oxide catalysts to high temperatures destroys the activity of the catalysts.

I have found that catalytic reactions may be carried out by passing a reactive gas mixture containing a carbon compound, at suitable temperatures and pressures, over a chromite catalyst which has been prepared by slightly heating an exothermic multiple salt containing hexavalent chromium, a hydrogenating metal and a nitrogen base, and allowing the decomposition to thereafter proceed spontaneously.

It is an object of the present invention to carry out catalytic processes by the use of highly efficient chromite catalysts.

It is a further object to carry out such catalytic processes by the use of chromite catalysts prepared by slightly heating exothermic multiple salts of hydrogenating metals and nitrogen bases.

It is a specific object to carry out such processes by the use of catalysts derived from double chromates of ammonia and a hydrogenating metal.

Further objects will be apparent from the description.

The following specific examples are given by way of illustration and not as a limitation.

*Example 1.*—Basic zinc ammonium chromate is prepared by cold precipitation as the result of mixing solutions containing molecular equivalents of zinc nitrate and ammonium chromate. When heated slightly to start the reaction, this basic salt decomposes spontaneously with the evolution of sufficient heat to leave a glowing residue consisting of combined zinc oxide and chromium sesquioxide. That the greater part of the zinc oxide is combined with the chromium oxide is evidenced by the fact that only about one-third of the zinc oxide may be extracted by five per cent acetic acid.

One liter of such a catalyst when placed in a pressure resisting copper lined tube yields 1300 cc. of crude condensate containing about 90% of methanol per hour at about 400° C. and about 300 atm. pressure from a gas consisting of about 30% carbon monoxide and about 60% hydrogen, when the gas mixture is passed through the catalyst at the rate of about 10,000 liters per hour as measured at normal temperature and pressure.

*Example 2.*—Manganese ammonium chromate is prepared by precipitation as the result of mixing solutions containing molecular equivalents of manganese nitrate and ammonium chromate. This double salt is heated to its decomposition point and a residue is obtained which, when used in the manner described in Example 1, produces 800 cc. of crude condensate per hour, containing about 50% methanol and 25% of alcohols of higher molecular weight.

Compounds of organic bases, such as zinc bichromate tetrapyridine, may be utilized in place of ammonium salts, and when heated these behave in an analogous manner and yield zinc chromites useful as catalysts.

*Example 3.*—Zinc bichromate tetrapyridine is prepared by the addition of pyridine in excess to a boiling solution of zinc bichromate, when the pyridine salt crystallizes out. When heated slightly to start the reaction, the pyridine salt decomposes spontaneously with the evolution of heat leaving zinc chromite as a glowing mass. This product yields 900 cc. per hour of crude condensate containing about 90% pure methanol per liter of catalyst.

The chromite catalytic bodies derived according to the methods just stated show great superiority in catalytic activity as compared with that of similar catalysts prepared, for example, by the reduction of chromates by heating in a stream of hydrogen at temperatures below 600° C.

In addition, it has been found that the activity of the chromite catalysts, prepared according to the present process, may be improved still further if the ignited product is treated to remove the less active substances present in such product, which substances are not combined in the form of chromite and are of low catalytic activity. The undesirable substances may be removed in any suitable way, such as by leaching the calcined product with a weak acid, e. g., acetic acid in concentrations of about 5-10%. The chromites made as described are stable and are substantially insoluble in water and in weak acids. The preparation of the catalysts, according to the present process, results in the formation of catalytic bodies of great porosity, which, after drying, consist of nearly pure, highly stable chromites substantially free from acid soluble oxides or other substances of low catalytic activity. These chromite catalysts are highly stable and do not lose their activity after use in a catalytic process. For instance, zinc chromite, which has been prepared as just described and was leached with acid prior to its use as a catalyst, is found to contain no additional acid soluble zinc after using the zinc chromite as a catalyst. The present catalysts have the further advantage that they are not affected by use at high temperatures.

As has been pointed out, the active catalysts forming the subject of the present invention are chromite compounds containing chromium in the trivalent form. However, the term chromite, as here used, does not necessarily refer to a compound of definite chemical composition since the chromite may contain widely differing proportions of its components. Zinc chromites, for example, are known to contain a varying proportion of zinc oxide, and this proportion is dependent on the ratio of zinc to chromium in the compound or mixture of compounds calcined and upon the temperature and duration of the calcination. In any event, the chromites contain the chromium in trivalent form.

The present catalysts contain chromium sesquioxide combined with oxides of other elements, i. e., as the chromites, and are suitable for general use in all of the catalytic processes in which chromium oxide mixed with other oxides is used as the catalyst. For instance, the chromite catalysts are suitable for use in the high pressure synthesis of oxygenated organic compounds such as methanol and alcohols of higher molecular weight from mixtures of hydrogen and oxides of carbon.

The chromite catalysts may also be used for the water gas reaction wherein carbon monoxide and water vapor are converted catalytically to carbon dioxide and hydrogen; or the catalysts may be used for dehydrogenations such as the catalytic conversion of an alcohol to an aldehyde.

Various elements may be combined with trivalent chromium oxide to form chromites which are suitable for use as catalysts. Zinc and manganese have already been mentioned as examples of the basic elements, which, combined with chromium oxide to form chromites, are extremely valuable catalysts, particularly when used for the methanol synthesis. In place of zinc and manganese any one of that group of elements, which, either in the form of the finely divided metals or in the form of the oxides, constitute active catalysts for the methanol synthesis, or for other reactions, may be combined with chromium oxide to form the corresponding chromite. Included in this group of metals, which will hereafter be designated as "hydrogenating metals," are zinc, copper, cadmium, magnesium, manganese, silver and iron.

In the various embodiments of the present invention, including the various methods of preparing chromite catalytic bodies, any one of these hydrogenating metals may be used as the more basic element to form the chromite; or, if desired, several of these metals may be used to form mixtures of the desired chromites.

As many apparently widely different embodiments of this invention may be made without departing from the spirit and scope thereof, it is to be understood that I do not limit myself to the specific embodiments thereof except as defined in the appended patent claims.

I claim:

1. In a catalytic process of forming organic compounds in a three-component reaction system comprising an oxygen-containing carbon compound capable of hydrogenation, an oxygen-containing carbon compound capable of dehydrogenation, and hydrogen, the step which comprises using as the catalyst a chromite prepared by igniting an exothermic double salt containing hexavalent chromium and a hydrogenating metal.

2. The process of claim 1 in which the ignited residue is leached with a dilute acid prior to its use as a catalyst.

3. In the process of carrying out an organic catalytic hydrogenation reaction by passing a reactive gas mixture at elevated temperature and pressure over a catalyst, the step which comprises using as the catalyst a chromite prepared by igniting an exothermic double salt containing hexavalent chromium and a hydrogenating metal.

4. In the process of synthesizing oxygenated organic compounds by passing a mixture of hydrogen with an oxide of carbon at elevated temperature and pressure over a catalyst, the step which comprises using as the catalyst a chromite prepared by igniting an exothermic double salt containing hexavalent chromium and a hydrogenating metal.

5. In the process of synthesizing oxygenated organic compounds by passing a mixture of hydrogen with carbon monoxide at elevated temperature and pressure over a catalyst, the step which comprises using as the catalyst a chromite prepared by igniting an exothermic double salt containing hexavalent chromium and a hydrogenating metal.

6. The process of claim 1 in which the catalyst is a chromite prepared by igniting a double chromate of ammonia and a hydrogenating metal.

7. In the process of synthesizing oxygenated organic compounds by passing a mixture of hydrogen with an oxide of carbon at elevated temperature and pressure over a catalyst, the step which comprises using as the catalyst a chomite prepared by igniting a double chromate of ammonia and a hydrogenating metal.

8. In the process of synthesizing oxygenated organic compounds by passing a mixture of hydrogen with carbon monoxide at elevated temperature and pressure over a catalyst, the step which comprises using as the catalyst a chromite prepared by igniting a double chromate of ammonia and a hydrogenating metal.

9. The process of claim 1 in which the catalyst is prepared by igniting a double chromate of a nitrogen base and a hydrogenating metal.

10. In the process of synthesizing oxygenated organic compounds by passing a mixture of hydrogen with an oxide of carbon at elevated temperature and pressure over a catalyst, the step which comprises using as the catalyst a chromite prepared by igniting a double chromate of a nitrogen base and a hydrogenating metal.

11. In the process of synthesizing oxygenated organic compounds by passing a mixture of hydrogen with carbon monoxide at elevated temperature and pressure over a catalyst, the step which comprises using as the catalyst a chromite prepared by igniting a double chromate of a nitrogen base and a hydrogenating metal.

12. The process of claim 1 in which the catalyst is prepared by igniting a double chromate of ammonia and zinc.

13. The process of claim 5 in which the ignited residue is leached with dilute acid prior to its use as a catalyst.

14. In the process of catalytically synthesizing methanol by passing a mixture of carbon monoxide with hydrogen at elevated temperature and pressure over a catalyst, the step which comprises using as the catalyst a chromite prepared by heating a double chromate of ammonia and zinc to its spontaneous decomposition temperature.

15. The process of claim 14 which comprises leaching the ignited residue with dilute acid prior to its use as a catalyst.

16. In the process of forming an oxygenated carbon compound of higher molecular weight than carbon monoxide by passing a reactive gas mixture containing carbon monoxide and a substance capable of reacting with said carbon monoxide over a catalyst, the step which comprises using as the catalyst a chromite prepared by igniting an exothermic double salt containing hexavalent chromium and a hydrogenating metal.

17. The process of claim 16 wherein the catalyst is prepared by igniting a double chromate of a nitrogen base and a hydrogenating metal.

18. The process of claim 16 wherein the catalyst is prepared by igniting a double chromate of ammonia and a hydrogenating metal.

19. The process of claim 16 wherein the catalyst is prepared by igniting a double chromate of ammonia and zinc.

20. In a catalytic process of forming organic compounds in a three-component reaction system comprising an oxygen-containing carbon compound capable of hydrogenation, an oxygen-containing carbon compound capable of dehydrogenation, and hydrogen, the step which comprises using as a catalyst a chromite prepared by igniting a double chromate of ammonia and a hydrogenating metal and leaching the ignited residue with dilute acid prior to its use as a catalyst.

21. In a catalytic process of forming organic compounds in a three-component reaction system comprising an oxygen-containing carbon compound capable of hydrogenation, an oxygen-containing carbon compound capable of dehydrogenation, and hydrogen, the step which comprises using as a catalyst a chromite prepared by igniting a double chromate of a nitrogen base and a hydrogenating metal and leaching the ignited residue with dilute acid prior to its use as a catalyst.

In testimony whereof, I affix my signature.

WILBUR A. LAZIER.